United States Patent
Kuchibhotla et al.

(10) Patent No.: US 7,305,251 B2
(45) Date of Patent: Dec. 4, 2007

(54) METHOD FOR SELECTING A CORE NETWORK

(75) Inventors: Ravi Kuchibhotla, Gurnee, IL (US);
Niels Peter Skov Andersen, Roskilde (DK); Stephen A. Howell, Gloucester (GB)

(73) Assignee: Motorola Inc., Schaumburg, IL (US)

( * ) Notice: Subject to any disclaimer, the term of this patent is extended or adjusted under 35 U.S.C. 154(b) by 395 days.

(21) Appl. No.: 10/680,690

(22) Filed: Oct. 7, 2003

(65) Prior Publication Data
US 2005/0075129 A1    Apr. 7, 2005

(51) Int. Cl.
*H04M 1/00*      (2006.01)

(52) U.S. Cl. .................. 455/552.1; 445/411; 370/338; 370/348

(58) Field of Classification Search ............. 455/552.1, 455/435, 445, 550.1, 456.6, 432, 426, 555, 455/434, 411; 709/226; 424/764; 370/338, 370/348, 394, 448; 379/321.01
See application file for complete search history.

(56) References Cited

U.S. PATENT DOCUMENTS

| | | | |
|---|---|---|---|
| 6,212,390 B1* | 4/2001 | Rune .................. | 455/456.6 |
| 6,539,237 B1* | 3/2003 | Sayers et al. ........... | 455/555 |
| 6,567,667 B1* | 5/2003 | Gupta et al. ........... | 455/445 |
| 6,741,868 B1* | 5/2004 | Park et al. ............. | 455/552.1 |
| 6,782,274 B1* | 8/2004 | Park et al. ............. | 455/552.1 |
| 6,801,786 B1* | 10/2004 | Korpela ............... | 455/552.1 |
| 2001/0005678 A1* | 6/2001 | Lee .................... | 455/445 |
| 2001/0046859 A1* | 11/2001 | Kil .................... | 455/426 |
| 2002/0072363 A1* | 6/2002 | Riihinen et al. ......... | 455/432 |
| 2002/0119774 A1* | 8/2002 | Johannesson et al. ..... | 455/434 |
| 2002/0147012 A1 | 10/2002 | Leung et al. | |
| 2003/0028644 A1* | 2/2003 | Maguire et al. ......... | 709/226 |
| 2003/0040311 A1* | 2/2003 | Choi ................... | 455/434 |
| 2003/0040313 A1* | 2/2003 | Hogan et al. ........... | 455/435 |
| 2003/0099219 A1* | 5/2003 | Abrol et al. ............ | 370/338 |
| 2003/0119481 A1* | 6/2003 | Haverinen et al. ....... | 455/411 |
| 2004/0014484 A1* | 1/2004 | Kawashima ........... | 455/550.1 |
| 2004/0202736 A1* | 10/2004 | Hernandez Munoz et al. | 424/764 |

OTHER PUBLICATIONS

3GPP TS 22.011 V6.1.0 (Jun. 2003) Technical Specification. $3^{rd}$ Generation Partnership Project; Technical Specification Group Services and System Aspects; Service Accessibility (Release 6).
3GPP TS 23.122 V5.2.0 (Dec. 2002) Technical Specification. $3^{rd}$ Generation Partnership Project; Technical Specification Group Core Network; NAS Functions Related To Mobile Station (MS) In Idle Mode (Release 5).

* cited by examiner

*Primary Examiner*—Joseph Feild
*Assistant Examiner*—Michael Vu
(74) *Attorney, Agent, or Firm*—Sylvia Chen

(57) ABSTRACT

A method (200) for selecting a core network for a communication device includes the steps of: receiving (220) at least one core network identifier; selecting (230) a core network identifier; setting (215) an indicator to indicate whether a substitute core network is allowed; determining (240) whether the selected core network identifier corresponds to a shared network; forming a registration request message containing the selected core network identifier; including (243) the indicator in the registration request message; and transmitting the registration request message.

22 Claims, 4 Drawing Sheets

METHOD FOR SELECTING A CORE NETWORK

CROSS REFERENCE TO RELATED APPLICATIONS

This application is related to the following U.S. patent applications:

U.S. patent application Ser. No. 10/680,662 filed on the same date herewith by Ravi Kuchibhotla et al. and entitled "Method and Apparatus for Routing Messages in a Network"; and U.S. patent application Ser. No. 10/680,681 filed on the same date herewith by Ravi Kuchibhotla et al. and entitled "Apparatus and Method for Shared Network"; and U.S. patent application Ser. No. 10/680,522 filed on the same date herewith by Ravi Kuchibhotla et al. and entitled "Wireless Access Network Sharing Among Core Networks and Methods".

All of the related applications are filed on the same date herewith, are assigned to the assignee of the present application, and are hereby incorporated herein in their entirety by this reference thereto.

FIELD OF THE DISCLOSURE

This disclosure relates generally to communications networks, and more particularly to the selection of a core network in a shared access network situation.

BACKGROUND OF THE DISCLOSURE

An access independent part of any network is known as a core network. In mobile communications networks a core network typically includes a mobile switching center, a packet data network, and other network entities. In other types of networks, similar network entities are present and perform various tasks such as routing communications and establishing packet sessions. An access dependent as routing communications and establishing packet sessions. An access dependent part of a network is known as an access network (AN). In wireless communications networks, an AN is known as a radio access network (RAN) which includes a radio network controller (RNC) or base station controller (BSC) and base stations or Node Bs. A RAN manages wireless communications links with user equipment (UE), sometimes called mobile stations (MS). Meanwhile, a CN manages communications links to fixed networks and mobile networks. Examples of fixed networks include a public-switched telephone network (PSTN), an Integrated Services Digital Network (ISDN), and the Internet. An example of a mobile network is a Public Land Mobile Network (PLMN). Often mobile networks are interconnected to fixed networks. The CN receives messages from a public switched telephone network (PSTN), mobile stations, and other core networks and core network entities.

In current mobile communications networks, the RAN and the CN are configured such that one radio access network is connected to only one core network. One RAN can be identified by one or more broadcasted identities. One CN is typically operated by one network operator and, for purposes such as routing, identified by one or more network identities.

A wireless communications system is coupled to other communications networks; each system typically operated by one operator or carrier. This type of system is currently used for GSM, CDMA, and TDMA type networks for example, and each system operator generally uses one type of network, e.g., either CDMA or GSM or TDMA. Each wireless communications system operates on an assigned frequency band because there are only a finite number of available frequencies. With the current systems, one system operator typically operates both the RAN and the core network. The RAN broadcasts a message that includes an identifier for the core network coupled to the RAN. The number of system operators is limited to the number of frequency licenses available for communications systems in a given area.

In current networks such as GSM, UMTS and CDMA2000, the RAN can be connected to one CN. This means that the RAN and the CN are able to use the same PLMN identity, where the PLMN identity is broadcast by the RAN and identifies the network. This means that when the mobile station selects the RAN, no separate selection of a CN operator needs to occur.

Emerging wireless communications technologies allows network operators to share resources. One example of network sharing is to share the radio access network resources by allowing multiple core networks operated typically by different operators to couple to a radio network controller (RNC) which controls the radio resources. This allows multiple service providers to use the same limited number of frequency bands. However, the RNC now must accommodate multiple system operators to ensure that the information from a MS is directed to the proper system operator or service provider. In the emerging universal mobile telephone system (UMTS), the routing of messages to one of many core networks, is limited on the basis of core network domain type (i.e., packet switched or circuit switched) and not by system operator, since there is only one system operator typically for both the radio network and the core network. In a shared RAN, however, multiple core network operators share the radio infrastructure and/or radio frequencies. Thus the RAN is now associated with multiple PLMN identities, i.e. core network operators.

Thus, there is a desire to allow UEs efficient access to the available PLMNs to provide wireless communications. Additionally, it is desirable to distribute user equipment equitably across the shared network to reduce traffic congestion and effectively allocate resources.

The various aspects, features and advantages of the disclosure will become more fully apparent to those having ordinary skill in the art upon careful consideration of the following Drawings and accompanying Detailed Description.

DETAILED DESCRIPTION OF THE PREFERRED EMBODIMENT

A method for selecting a core network for a communication device includes the steps of: receiving at least one core network identifier at the communication device, selecting a core network identifier to form a selected core network identifier, setting an indicator to indicate whether a substitute core network is allowed, determining whether the selected core network identifier corresponds to a shared network, forming a registration request message containing the selected core network identifier, including the indicator in the registration request message, and transmitting the registration request message.

The indicator indicates that a substitute core network is disallowed when the core network identifier is selected during a manual network selection mode, or when the core network identifier is selected during certain stages of an automatic network selection mode. The indicator indicates that a substitute core network is allowed when the core network identifier is selected during other stages of the automatic network selection mode. The substitute core network can be either the same core network or a different core network in the shared network of the one indicated by the selected core network identifier.

The method also includes the steps of: receiving a registration request message, extracting a selected core network identifier from the registration request message, and determining if the registration request message includes an indicator indicating whether a substitute core network is allowed. If a substitute core network is allowed, the network determines a substitute core network, which can be either the same core network or a different core network in the shared network of the one indicated by the selected core network identifier, and forwards the registration request message to the substitute core network.

This method gives a user the same control and flexibility as PLMN selection in non-shared radio access network situations, but also allows the network flexibility to substitute a core network in a shared network for another core network coupled to that shared access network.

Figure 1:
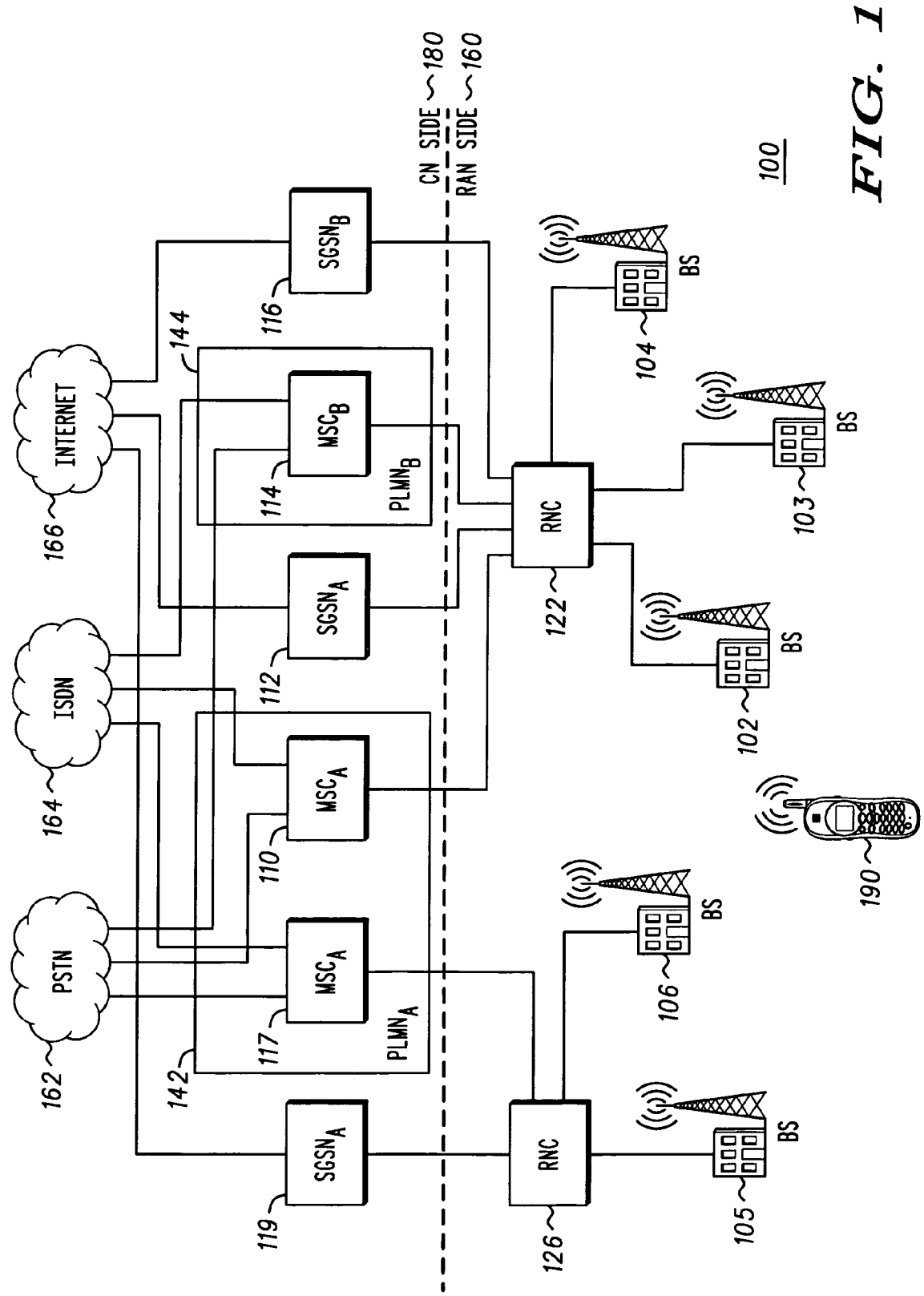
FIG. 1 shows a simplified wireless communications system including a shared access network according to a preferred embodiment.

FIG. 1 shows a simplified wireless communications system 100 including shared access network according to a preferred embodiment. The system 100 includes a first radio network controller (RNC) 122 coupled to at least one associated base station (BS) 102, 103, 104. The system 100 also includes a second RNC 126 coupled to at least one associated BS 105, 106. For completeness, the system 100 also includes a wireless communication device 190, sometimes referred to as a mobile station (MS) or user equipment (UE). The RNCs 122, 126 and their associated base stations 102, 103, 104, 105, 106 are part of a radio access network (RAN) side 160 of the system 100. Depending on the radio access technology, different terminology is used for similar network entities. For example, sometimes an RNC is referred to as a base station controller (BSC) and a BS is referred to as a base transceiver station (BTS).

A core network (CN) side 180 of the system 100 is coupled to the RNCs 122, 126 in the RAN side 160. A first mobile switching center (MSC) 110 and a first serving GPRS support node (SGSN) 112 for a first service provider are coupled to the first RNC 122. A second MSC 114 and a second SGSN 116 for a second service provider is also coupled to the first RNC 122. Thus, two core networks are illustrated in FIG. 1 as being associated with a single RNC 122 in a radio access resource sharing configuration. One skilled in the art understands, however, that more core networks may be coupled to a single RNC for radio access resource sharing.

A third MSC 117 and a third SGSN 119 for the first service provider are coupled to the second RNC 126. These elements illustrate a traditional non-shared radio access network configuration. In this FIG. 1, the first service provider operates with both the non-shared radio access network and a portion of the shared radio access network. Meanwhile, the second service provider only operates a portion of the shared radio access network. An MSC and an SGSN are not both required in a core network.

The MSCs 110, 117 are part of a core network, such as a Public Land Mobile Network (PLMN) 142, established and operated by the first service provider. The MSC 114 is part of another core network, such as a Public Land Mobile Network (PLMN) 144, established and operated by the second service provider.

The CN side 180 is interconnected with various fixed networks as well as the two mobile networks. The MSCs 110, 114, 117 are connected to fixed circuit-switched networks such as a public switched telephone network (PSTN) 162 and an integrated services digital network (ISDN) 164. The SGSNs 112, 116, 119 are connected to a fixed packet-switched network such as the Internet 166.

Each core network in a radio access resource sharing situation generally has a different PLMN, because each service provider with its own PLMN is operating a single core network in the shared network. A RAN, however, generally broadcasts only one identifier for a core network (PLMNid) at frequent intervals. There are various schemes for overcoming this single-PLMNid broadcast, which include broadcasting a pseudo PLMNid that corresponds to multiple PLMNs coupled to a shared radio access resource. Another scheme for overcoming this single-PLMNid broadcast is to send the individual PLMNids of the core networks corresponding to the shared radio access resource at less frequent intervals or upon demand.

The UE 190 is capable of forming a communication link with at least one of the base stations 102, 103, 104, 105, 106 on the RAN side 160. Upon switch-on of the UE, if the UE is within coverage of the last PLMN on which it was registered (RPLMN), the UE will attempt to register on that RPLMN. If the RPLMN is not available, or if the UE was unable to register on the RPLMN, or if there is no RPLMN identifier stored on the UE (or its associated subscriber identity module (SIM)), then the UE shall select a PLMN in either an automatic network selection mode or a manual network selection mode.

In some situations, rather than leaving the UE alone to select a PLMN, it might be more efficient for the network to participate in selecting a PLMN for the UE to, for example, equalize traffic in a shared network or otherwise allocate resources in a shared network. On the other hand, a user may specifically prefer a particular PLMN for reasons such as cost or services offered. A UE, however, may select a particular PLMNid for registration and not actually prefer that PLMN. Especially in this situation, it may be advantageous to allow the network to override the PLMNid selection and register instead on another PLMN in a shared network.

Figure 2:
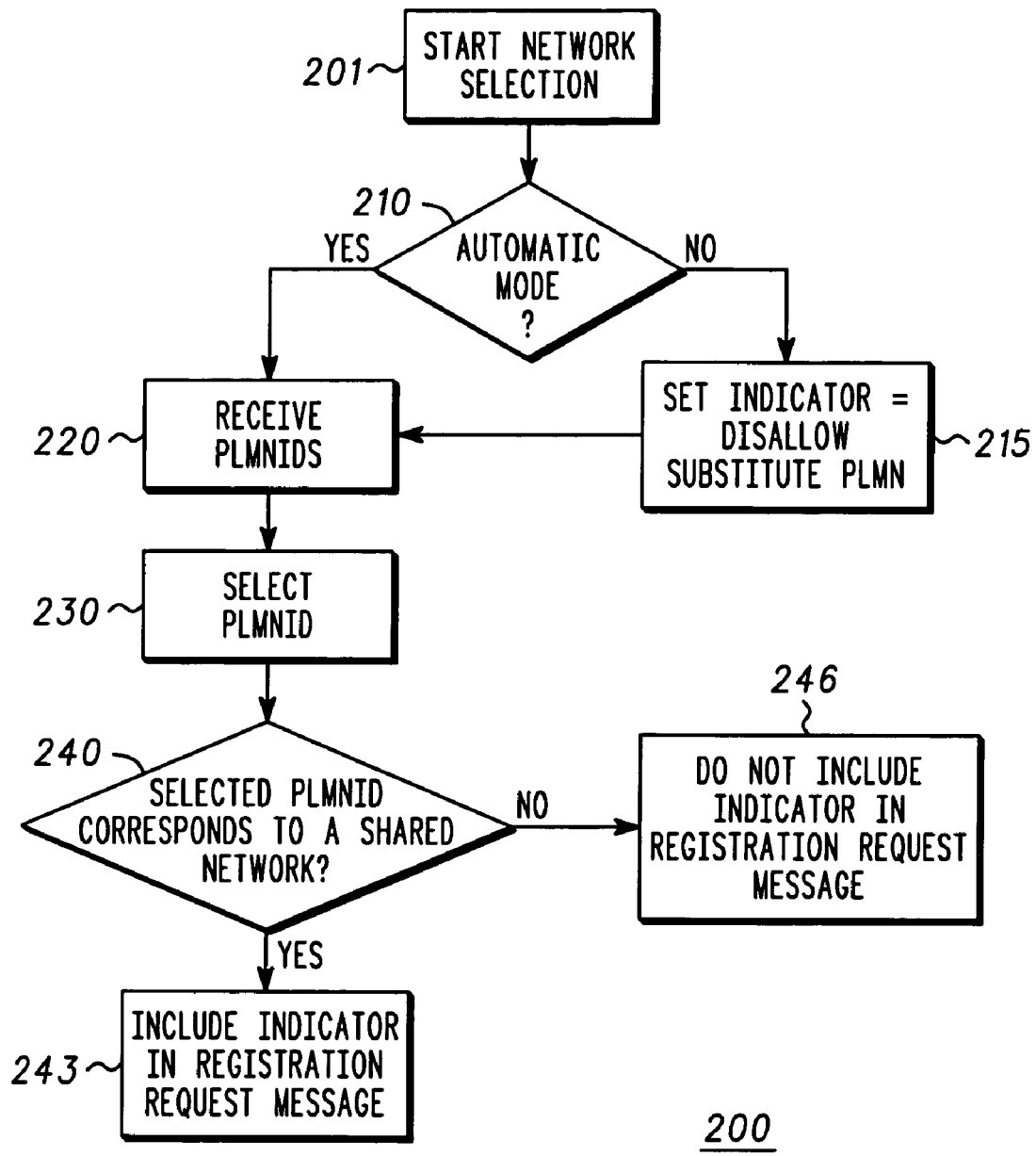
FIG. 2 shows a flow diagram for a user equipment side of a core network selection method according to the preferred embodiment.

FIG. 2 shows a flow diagram 200 for a user equipment side of a core network selection method according to a preferred embodiment. We shall use as an example the UE 190 in FIG. 1, which has just been switched on in the vicinity of five base stations 102, 103, 104, 105, 106 which are coupled to MSCs 110, 114, 117 in two different PLMNs 142, 144.

After step 201 starts the core network selection method, step 210 determines if the UE is in automatic network selection mode. If the UE is not in automatic network selection mode (i.e., the UE is in manual network selection mode), the UE will set an indicator to "disallow substitute PLMN" in step 215 before going to step 220. Otherwise, the flow goes directly to step 220, where the UE will receive PLMNids from base stations within communication range. In the example from FIG. 1, the UE would receive two PLMNids from the RAN of the shared network, identifying the two sharing service providers, and another PLMNid from the RAN of the non-shared network.

Figure 3:
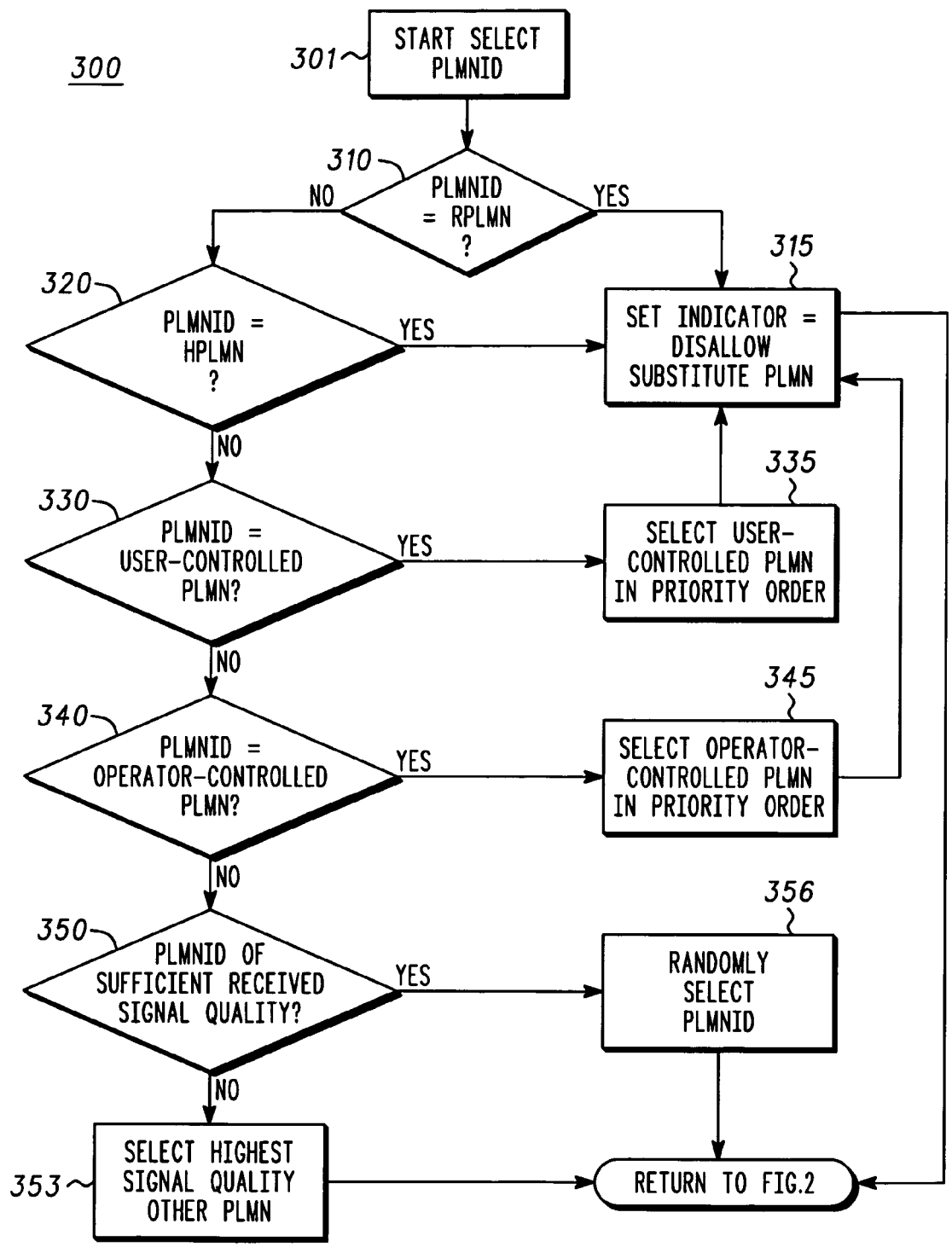
FIG. 3 shows a detailed flow diagram for "select PLMNid" according to the preferred embodiment.

Next, step 230 directs the UE to select a PLMNid. Selection occurs according to a predefined technical specification, such as the 3GPP TS 22.011 v6.1.0, entitled "3rd Generation Partnership Project; Technical Specification Group Services and System Aspects; Service accessibility (Release 6)." FIG. 3 will explain details of automatic network selection. In manual network selection, the PLMNids are presented to the user in a specified order, and the user selects the desired PLMNid. The order given in technical specification 3GPP TS 22.011 v6.1.0 is: RPLMN (as discussed earlier), home PLMN (HPLMN), user-controlled PLMN list (in priority order), operator-controlled PLMN list (in priority order), PLMNs with sufficient received signal quality (in random order), and all other PLMNs in order of decreasing signal quality.

If the selected PLMNid corresponds to a shared network, as determined in step 240, the UE will form a registration request for the selected PLMNid that includes the indicator in step 243. If the selected PLMNid does not correspond to a shared network, an indicator is not required in the registration request in step 245. If the UE does not determine if the selected PLMNid corresponds to a shared network, then the default is not to include the indicator as in step 245. Alternate defaults, such as always including an indicator set to "disallow substitute PLMN" or always including an indicator set to "allow substitute PLMN", are also acceptable. At this point, the registration request is transmitted from the UE.

Returning to step 230, FIG. 3 shows a detailed flow diagram 300 for "select PLMNid" according to the preferred embodiment. Step 301 starts the method for "select PLMNid." First, the UE determines in step 310 whether any received PLMNid (from step 220 of FIG. 2) is the same as the last registered PLMN (RPLMN). If a PLMNid is for the RPLMN, then the UE shall register on that PLMN. Then, the indicator is set to "disallow substitute PLMN" in step 315 and the flow returns to FIG. 2 at step 240.

If there is no RPLMN stored in the UE, or if the RPLMN is not available and no equivalent PLMN is available, in step 320 the UE checks for a received PLMNid that is a home PLMN (HPLMN) for preferred access technologies. If a received PLMNid matches a HPLMN, the indicator is set to "disallow substitute PLMN" in step 315 and the flow returns to FIG. 2 at step 240.

If no PLMNid corresponding to an HPLMN is available, the UE checks received PLMNs against a user-controlled list of PLMNs in step 330. The user-controlled list has a priority order, and if a PLMNid matches a PLMN in the list, the UE selects the highest match in step 335. Once again, the indicator is set to "disallow substitute PLMN" in step 315 and the flow returns to FIG. 2 at step 240. Note that it is possible to include pseudo PLMNids in the user-controlled list instead of or in addition to the multiple PLMNs in a shared radio access network.

Similarly, if no PLMNid corresponding to a user-controlled PLMN list is available, the UE checks received PLMNs against an operator-controlled list of PLMNs in step 340. The operator-controlled list also has a priority order, and if a PLMNid matches a PLMN in the list, the UE selects the highest match in step 345. Then, the indicator is set to "disallow substitute PLMN" in step 315 and the flow returns to FIG. 2 at step 240. Note that it is possible to include pseudo PLMNids in the operator-controlled list instead of or in addition to the multiple PLMNids in a shared radio access network.

If there are no PLMNids corresponding to the operator-controlled PLMN list, the UE checks for PLMNids in signals of sufficient received signal quality in step 350. According to the technical specification 3GPP TS 22.011 v6.1.0, one of the PLMNids of sufficient received signal quality is randomly selected. Step 356 randomly selects one of the PLMNids of sufficient received signal quality.

If there are no PLMNids in signals of sufficient received signal quality, the UE selects the highest signal quality PLMN in step 353.

Figure 4:
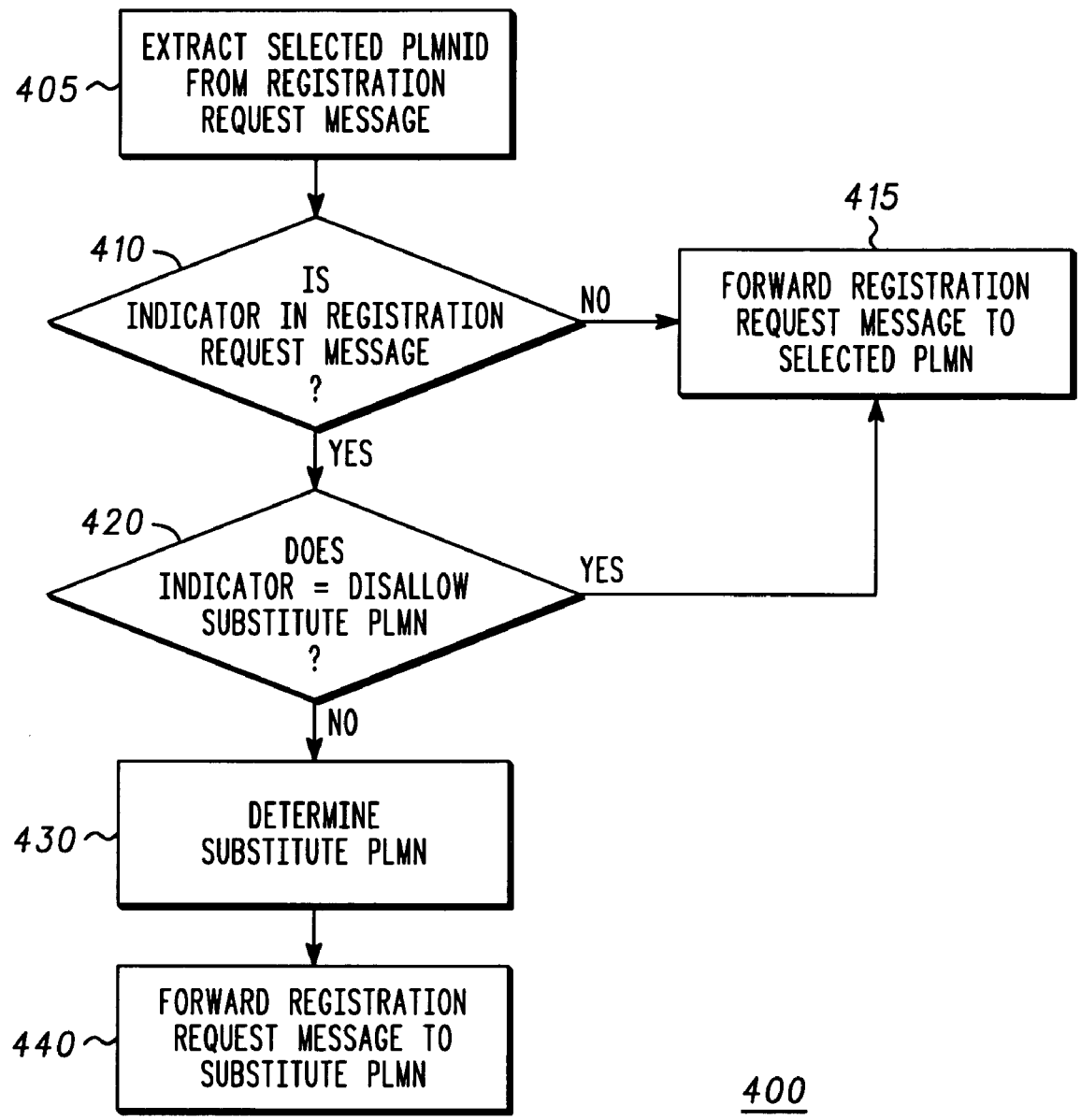
FIG. 4 shows a flow diagram for a network side of a core network selection according to the preferred embodiment.

Note that the indicator is not set to "disallow substitute PLMN" if a PLMN was selected during step 353 or step 356. Turning to FIG. 4, the registration request message is received by the radio access network and interpreted according to the indicator, or its absence.

FIG. 4 shows a flow diagram 400 for a network-side of a core network selection method according to the preferred embodiment. When a RAN receives a registration request message from a UE, step 405 extracts the selected PLMNid from the registration request message. Next, step 410 determines if there is an indicator included in the message. If there is no indicator, the RNC forwards the registration request message to the PLMN identified by the selected PLMNid in step 415. If there is an indicator, step 420 determines if the indicator is set to "disallow substitute PLMN." If a substitute PLMN is not allowed, the RNC forwards the registration request message to the PLMN identified by the selected PLMNid in step 415.

If the indicator does not equal "disallow substitute PLMN," the network determines a substitute PLMN in step 430. The substitute PLMN can be selected by the network based on factors such as cost to the user, traffic congestion in the core network, and agreements among the service operators of the shared radio accessnetwork. Based on the network selection factors, a different PLMN or the same PLMN can be determined as a substitute PLMN. After the substitute PLMN is determined, step 440 forwards the registration request message to the substitute PLMN.

For example, the first service provider in FIG. 1 may be experiencing high traffic or technical difficulties within its PLMN 142. When a UE 190 sends a registration request message with the PLMNid of the PLMN 142 plus an indicator that allows a substitute PLMN, the shared radio access network can forward the registration request message to the second PLMN 144 to avoid further compounding problems within the first PLMN 142.

Thus, the method for core network selection in a shared accessnetwork situation allows the user the same control and flexibility as PLMN selection in non-shared radio access network situations, but also allows the network flexibility to substitute a core network in a shared network for another core network coupled to that shared radio access resource.

While this disclosure includes what are considered presently to be the preferred embodiment and best modes of the invention described in a manner that establishes possession thereof by the inventors and that enables those of ordinary skill in the art to make and use the invention, it will be understood and appreciated that there are many equivalents to the preferred embodiment disclosed herein and that modifications and variations may be made without departing from the scope and spirit of the invention, which are to be limited not by the preferred embodiment but by the appended claims, including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

We claim:

1. A method for selecting a core network for a communication device comprising the steps of:
   receiving at least one public land mobile network identifier (PLMNid);
   selecting a PLMNid to form a selected public land mobile network identifier;
   setting an indicator to indicate whether a substitute public land mobile network is allowed;
   determining whether the selected public land mobile network identifier corresponds to a shared network;
   forming a registration request message containing the selected public land mobile network identifier;
   including the indicator in the registration request message, if the selected public land mobile network identifier corresponds to a shared network; and
   transmitting the registration request message.

2. A method according to claim 1 wherein the step of selecting includes the communication device automatically choosing the selected public land mobile network identifier according to the following priority levels:
   (1) registered public land mobile network,
   (2) home public land mobile network,
   (3) user-controlled list of public land mobile networks,
   (4) operator-controlled list of public land mobile networks,
   (5) public land mobile networks with sufficient received signal quality in random order, and
   (6) other public land mobile networks in order of received signal quality.

3. A method according to claim 2 wherein the step of setting indicates that a substitute public land mobile network is allowed when the selected public land mobile network identifier is selected at priority level (5).

4. A method according to claim 2 wherein the step of setting indicates that a substitute public land mobile network is allowed when the selected public land mobile network identifier is selected at priority level (6).

5. A method according to claim 1 wherein the step of selecting includes the communication device presenting the at least one PLMNid to a user according to the following priority levels:
   (1) registered public land mobile network,
   (2) home public land mobile network,
   (3) user-controlled list of public land mobile networks,
   (4) operator-controlled list of public land mobile networks,
   (5) public land mobile networks with sufficient received signal quality in random order, and
   (6) other public land mobile networks in order of received signal quality.

6. A method according to claim 5 wherein the step of selecting further includes:
   receiving a selected public land mobile network identifier from the user.

7. A method according to claim 5 wherein the step of setting comprises:
   setting the indicator to indicate that a substitute public land mobile network is disallowed.

8. A method according to claim 1 wherein the step of setting comprises:
   setting the indicator to indicate that a substitute public land mobile network is disallowed.

9. A method for selecting a public land mobile network for a communication device comprising the steps of: receiving a registration request message; extracting a selected public land mobile network identifier from the registration request message; and determining if the registration request message includes an indicator indicating whether a substitute public land mobile network is allowed, and determining a substitute public land mobile network, if the indicator indicates that a substitute public land mobile network is allowed; and forwarding the registration request message to the substitute public land mobile network, thereto.

10. A method according to claim 9 wherein the substitute public land mobile network shares radio access resources with a core network indicated by the selected core network identifier.

11. A method according to claim 9 wherein the substitute public land mobile network is a co public land mobile re network indicated by the selected public land mobile network identifier.

12. A method according to claim 9 wherein the substitute public land mobile network is not a public land mobile network indicated by the selected public land mobile network identifier.

13. A method according to claim 9 further comprising the step of:
   forwarding the registration request message to a public land mobile network identified by the selected public land mobile network identifier, if the indicator indicates that a substitute public land mobile network is not allowed.

14. A method according to claim 9 further comprising the step of:
   forwarding the registration request message to a public land mobile network identified by the selected public land mobile network identifier, if the registration request message does not include an indicator.

15. A method for selecting a public land mobile network (PLMN) for user equipment (UE) comprising the steps of:
   receiving at least one PLMN identifier (PLMNid);
   selecting a PLMNid to form a selected PLMNid;

setting an indicator to indicate whether a substitute PLMN is allowed;

determining whether the selected PLMNid corresponds to a shared radio access network (RAN);

forming a registration request message with the selected PLMNid;

including the indicator in the registration request message, if the selected PLMNid corresponds to a shared RAN; and transmitting the registration request message from the UE.

16. The method according to claim 15 wherein the step of setting comprises:

setting the indicator to indicate that a substitute PLMN is disallowed when the UE is in manual network selection mode.

17. The method according to claim 15 wherein the step of setting comprises:

setting the indicator to indicate that a substitute PLMN is disallowed when the UE automatically selects a PLMNid that corresponds to a registered PLMN (RPLMN) of the UE, a home PLMN (HPLMN) of the UE, a PLMN on a user-controlled list of PLMNs, or a PLMN on an operator-controlled list of PLMNs.

18. A method according to claim 15 further comprising the steps of:

receiving the registration request message at a radio access network (RAN);

extracting the selected PLMNid from the registration request message; and determining if the registration request message includes the indicator.

19. The method according to claim 18 further comprising the steps of:

determining a substitute PLMN, if the indicator indicates that a substitute PLMN is allowed; and forwarding the registration request message to the substitute PLMN.

20. The method according to claim 19 wherein the substitute PLMN shares radio access resources with a PLMN indicated by the selected PLMNid.

21. A method for selecting a public land mobile network for a communication device comprising the steps of: receiving at least one public land mobile network identifier; selecting a public land mobile network identifier to form a selected public land mobile network identifier; setting an indicator to indicate whether a substitute public land mobile network is allowed; determining whether the selected public land mobile network identifier corresponds to a shared network; forming a registration request message containing the selected public land mobile network identifier; including the indicator in the registration request message; and transmitting the registration request message, thereto.

22. A method according to claim 5 wherein the priority level (3) user-controlled list of public land mobile networks is presented in priority order.

* * * * *